United States Patent
Neubrand et al.

(10) Patent No.: US 6,866,324 B2
(45) Date of Patent: Mar. 15, 2005

(54) FOLDING HARDTOP WITH REAR WINDOW ARTICULATION

(75) Inventors: Frank Neubrand, West Bloomfield, MI (US); Wolfgang Ulrich Richter, Commerce Township, MI (US)

(73) Assignee: SSR Roofing Systems, L.L.C., Plymouth, MI (US)

( * ) Notice: Subject to any disclaimer, the term of this patent is extended or adjusted under 35 U.S.C. 154(b) by 86 days.

(21) Appl. No.: 10/359,950

(22) Filed: Feb. 6, 2003

(65) Prior Publication Data

US 2004/0004369 A1 Jan. 8, 2004

Related U.S. Application Data

(60) Provisional application No. 60/359,522, filed on Feb. 25, 2002, and provisional application No. 60/393,825, filed on Jul. 3, 2002.

(51) Int. Cl.[7] .................................................. B60J 7/14
(52) U.S. Cl. ................................ 296/108; 296/107.07
(58) Field of Search ....................... 296/107.07, 107.08, 296/107.17, 108

(56) References Cited

U.S. PATENT DOCUMENTS

| | | | |
|---|---|---|---|
| 2,234,040 A | 3/1941 | Carr | 296/107.2 |
| 2,303,789 A | 12/1942 | Carr | 296/107.2 |
| 2,957,725 A | 10/1960 | Ford | 296/107.2 |
| 3,536,354 A | 10/1970 | Ingram | 296/147 |
| 4,543,747 A | 10/1985 | Kaltz et al. | 296/49 |
| 4,784,428 A | 11/1988 | Moy et al. | 296/107.07 |
| 5,195,798 A * | 3/1993 | Klein et al. | 296/146.14 |
| 6,019,416 A | 2/2000 | Beierl | 296/107.17 |
| 6,039,383 A * | 3/2000 | Jambor et al. | 296/108 |
| 6,073,988 A | 6/2000 | Huber | 296/116 |
| 6,086,136 A * | 7/2000 | Jambor et al. | 296/107.17 |
| 6,123,381 A | 9/2000 | Schenk | 296/107.07 |
| 6,131,988 A | 10/2000 | Queveau | 296/107.17 |
| 6,142,555 A | 11/2000 | Huber | 296/107.17 |
| 6,257,648 B1 | 7/2001 | Schenk | 296/107.07 |
| 6,283,532 B1 | 9/2001 | Neubrand | 296/107.07 |
| 6,302,470 B1 | 10/2001 | Maass | 296/107.07 |
| 6,382,703 B1 * | 5/2002 | Queveau et al. | 296/107.17 |
| 6,390,532 B1 | 5/2002 | Mac Farland | 296/107.17 |
| 6,425,620 B1 * | 7/2002 | Schutt et al. | 296/107.07 |
| 6,485,085 B1 | 11/2002 | Pecho | 296/107.07 |
| 6,497,446 B2 | 12/2002 | Obendiek | 296/107.17 |
| 6,513,857 B2 | 2/2003 | Pfertner | 296/107.07 |
| 6,582,009 B2 | 6/2003 | Wezyk | 296/180.1 |
| 6,592,169 B2 | 7/2003 | Obendiek | 296/107.07 |
| 6,629,718 B2 | 10/2003 | Bauer et al. | 296/108 |
| 2001/0033089 A1 | 10/2001 | Maass | 296/107.17 |
| 2002/0050727 A1 | 5/2002 | Hasselgruber | 296/107.17 |
| 2002/0185886 A1 | 12/2002 | Obendiek | 296/108 |
| 2003/0047962 A1 | 3/2003 | Guillez | 296/107.18 |
| 2003/0160475 A1 | 8/2003 | Tohda et al. | 296/124 |

* cited by examiner

*Primary Examiner*—Dennis H. Pedder
(74) *Attorney, Agent, or Firm*—Gifford, Krass, Groh, Sprinkle, Anderson & Citkowski, PC

(57) ABSTRACT

A retractable hardtop system with a rigid front panel and a rear portion including a pair of C-pillars and a central window panel therebetween has the window panel hingedly linked to the C-pillars and the C-pillars hingedly linked to both the vehicle body and the front panel. In a retracted position, a portion of the central window panel is articulated to an elevated position with respect to the C-pillars in order to increase usable space below the retracted system.

11 Claims, 12 Drawing Sheets

FOLDING HARDTOP WITH REAR WINDOW ARTICULATION

REFERENCE TO RELATED APPLICATIONS

This application claims priority from U.S. Provisional Patent Application Ser. Nos. 60/359,522, filed Feb. 25, 2002, and 60/393,825, filed Jul. 3, 2002, the entire content of each application being incorporated herein by reference.

FIELD OF THE INVENTION

The present invention relates generally to retractable roof structures for automobiles and, more specifically, to a retractable hardtop with an articulating rear window.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs, and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, fold into a compact shape. While convertible soft tops offer the choice between a covered or uncovered passenger compartment, they also suffer from several disadvantages in comparison to traditional rigid roof structures. Vehicles with soft tops are typically less well sealed against the elements and are somewhat noisy. They are also less resistant to break-in attempts and have a less finished interior appearance.

The other retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins. However, the retraction and storage of the hardtop presents significant mechanical challenges. Typically, when the retractable hardtop is in the retracted position, it resides in the portion of the vehicle traditionally provided for storage, such as the vehicle's trunk. While the storage space may be completely usable when the hardtop is in the extended position, most consumers prefer not to sacrifice the use of the storage position when the roof is retracted. There is generally a tradeoff between storage efficiency and mechanical complexity.

Most modern retractable hardtop designs consist of two or more articulated sections that are automatically folded or stacked in the storage area. In one design, referred to as a "clamshell" design, the roof structure is divided into a front section and a rear section. The front and rear sections are pivotally interconnected and the rear section is pivotally connected to a support structure behind the passenger compartment. Examples of clamshell type retractable hardtop designs are shown in U.S. Pat. No. 6,217,104 to Neubrand, and U.S. Pat. No. 5,785,375 to Alexander et al.

In a clamshell design, the front and rear sections may both be said to have an inner and an outer surface, with the outer surfaces cooperating to form the outer surface of the roof structure when in the extended position. When retracted, the front section folds so as to bring the inner surface of the front section towards the inner surface of the rear section, and both sections are together positioned into the storage area. Often, the deck lid of the vehicle articulates into an out-of-the-way position to allow the hardtop sections to move into a position in the trunk. The deck lid is then repositioned to cover the pair of roof sections. In most designs, the front and rear sections both have generally convex outer surfaces and concave inner surfaces. Therefore, when the inner surfaces are folded towards one another, the concave shapes cause there to be a significant distance between the mid-portions of the folded front and rear sections. Consequently, clamshell designs do not store as compactly as some other designs. Their advantage is that they are significantly less complex than most other designs. Reduced complexity not only reduces manufacturing costs, but also improves reliability of the system. Clamshell designs also have better structural integrity than some other designs.

An alternative design, which provides improved storage efficiency, may be referred to as a "stacking" design. Again, the roof is divided into two or more sections. However, when the hardtop is retracted, the roof sections are stacked such that the inner surface of one section is adjacent to the outer surface of another section. Because each section typically has a concave inner surface and a convex outer surface, placing the inner surface of one section next to the outer surface of another often results in more efficient space utilization. Examples of stacking retractable hardtop designs are shown in U.S. Pat. No. 6,336,673 to Rothe et al., U.S. Pat. No. 6,318,793 to Rapin et al., U.S. Pat. No. 6,053,560 to Rothe, and U.S. Pat. No. 5,979,970 to Rothe et al. As will be clear to those of skill in the art, stacking designs require significantly more complex articulation mechanisms than clamshell designs. This increased complexity leads to increased costs, reduced reliability, and reduced structural integrity.

There have been several attempts to provide clamshell designs with improved packaging. In one approach, the rear window or backlight is articulated in some manner to increase the space between the outer surface of the backlight and the bottom of the trunk. In a typical clamshell design, after the front and rear sections are folded into the trunk, the rear section, including the backlight, is positioned under the front section, and the outer surface of the rear section and backlight face the bottom of the trunk. Typically, the rear section has an outer surface that is convex, and therefore curves toward the floor of the trunk. The backlight, especially where the backlight forms a substantial portion of the rear section, is the component positioned nearest to the bottom of the trunk. Also, there is typically a significant gap between the inside surface of the rear section and the inside surface of the front section when they are clam-shelled together into the trunk. Articulating backlight designs move the backlight upwardly into the space, so as to reduce the amount of wasted volume.

PCT Publication No. WO 01/62533 A1 to Queveau discloses a clamshell style folding hardtop with an articulating rear window that is pivotally connected to the front roof section near the front edge of the rear window. The window is hinged to the side sections or C-pillars of the rear roof section close to the rear of the window. This design allows the rear window to remain closer to the front roof section when the hardtop is stowed.

U.S. Pat. No. 6,086,136 to Jambor et al. discloses a clamshell style roof with an articulating rear window having its rear end pivotally interconnected with the remainder of the rear roof section. A drag lever has one end connected to the rear window, forward of the pivot, and the other end connected with the vehicle body. As the hardtop moves to its stowed position, the drag link causes the window to rotate about the pivot such that the end of the window nearest the front roof section moves upwardly.

U.S. Pat. No. 6,131,988 to Queveau et al. discloses a clamshell style articulating hardtop wherein the rear window is supported by the C-pillars using a rotational connection, which allows the rear window to flip over with respect to the remainder of the rear section during retraction of the hardtop. This positions the rear window at a distance above the remainder of the rear section and positions it close to the underside of the front roof section.

U.S. Pat. No. 6,425,620 to Schutt et al. discloses a clamshell style retracting hardtop with a rear window that is pivotally attached at its rear end to a cross member that forms part of the rear roof section. An articulating mechanism interconnects an intermediate portion of the rear window with the C-pillars and moves the window upwardly towards the front roof section during retraction.

U.S. Pat. No. 6,390,532 to Mac Farland discloses a stacking retractable hardtop design wherein the rear window articulates upwardly with respect to the remainder of the hardtop during retraction. The upper end of the rear window is pivoted to the remainder of the rear section, with the rear portion of the window being linked to both the body and the C-pillar.

While each of the above designs offers some benefits in terms of space efficiency, they each have certain limitations that limit their use. Consequently, there remains a need for retractable hardtop designs that offer an improved compromise between space, efficiency and mechanical complexity.

SUMMARY OF THE INVENTION

The present invention provides a retractable hardtop system for a vehicle having a passenger compartment and a storage area behind the passenger compartment. The hardtop system has an extended position wherein the hardtop defines a roof over the passenger compartment and a retracted position wherein the hardtop system does not cover the passenger compartment and at least a portion of the hardtop system is disposed in the storage area. The vehicle has a body, and a windshield defining the forward end of the passenger compartment. The windshield has a header. The hardtop system includes a support assembly for supporting the remainder of the hardtop system and interconnecting with the vehicle body. A generally rigid front panel has a forward edge and rearward edge. The forward edge of the front panel interconnects with a windshield header and the front panel defines a front portion of the roof over the passenger compartment when the system is in the extended position. The front panel has an inner surface and an outer surface. A rear portion is disposed rearwardly of the front panel and defines the remainder of the roof over the passenger compartment when the system is in the extended position. The rear portion includes a central window panel and a pair of C-pillars. The central window panel has a forward edge, a rearward edge, and a pair of sides. The C-pillars each have a forward edge, a rearward edge, an inside edge, and an outside edge. The insides of the C-pillars are disposed adjacent the sides of the central window panel when the system is in the extended position. The central window panel is hingedly linked to the C-pillars. The C-pillars are each hingedly linked to the support assembly at the rearward edges and hingedly linked to the front panel at the forward edges. A balance link has one end hingedly interconnected with the front panel and another end hingedly interconnected with the support assembly. A window link has a first end pivotally interconnected with a central window panel and a second end pivotally interconnected with the balance link. The system is configured such that when the system is in the retracted position, at least a portion of the central window panel is articulated to a position wherein the distance between the portion of the central window panel and the inner surface of the front panel is less than a distance between the inside edges of the C-pillars and the inner surface of the front panel.

In an alternative embodiment, the central window panel is hingedly linked with a support assembly at its rearward edge and hingedly linked to the front panel at its forward edge. In this embodiment, a window link is not provided, and the window is not hingedly interconnected with the C-pillars.

DETAILED DESCRIPTION OF THE PREFERRED EMBODIMENTS

The present invention provides a retractable hardtop system where at least a portion of the rear window is articulated upwardly with respect to the C-pillars when the hardtop is stowed in the storage area behind the passenger compartment. This provides increased storage space in the storage area when the hardtop is stowed, as compared to a system wherein the rear window does not move with respect to the C-pillars.

Figure 1:
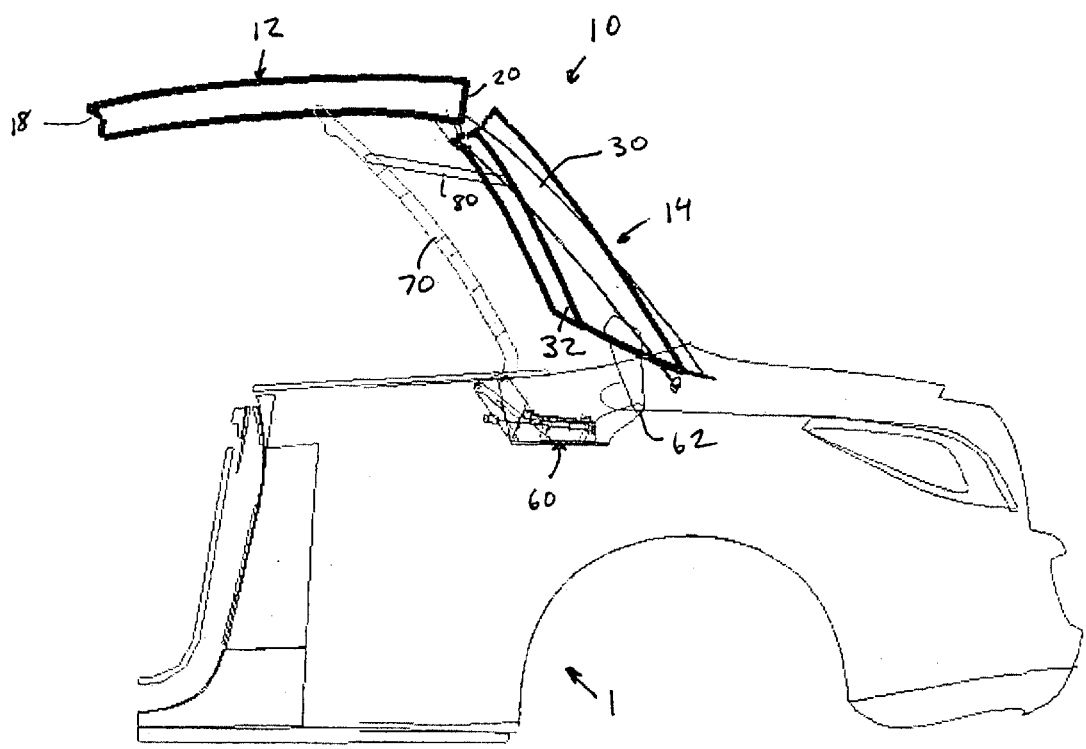
FIG. 1 is a side elevational view of a first embodiment of a retractable hardtop system according to the present invention, with the top partially retracted.
Figure 2:
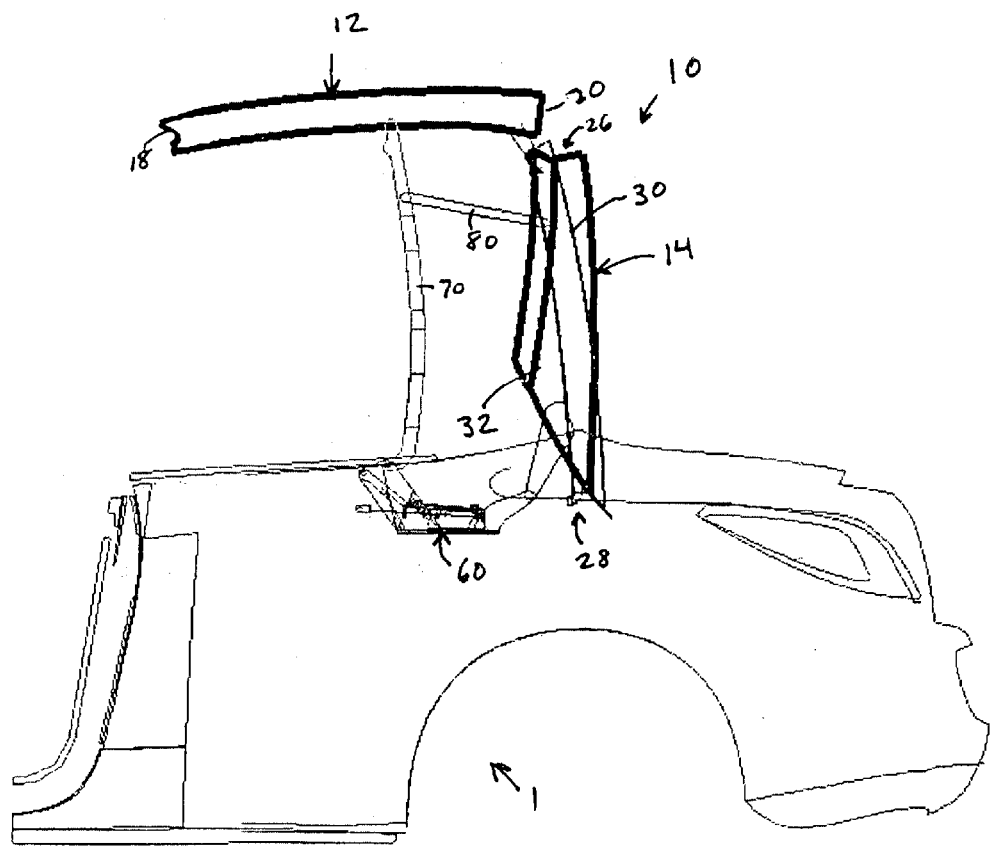
FIG. 2 is a side elevational view of the hardtop system of FIG. 1, with the hardtop approximately half way retracted.
Figure 3:
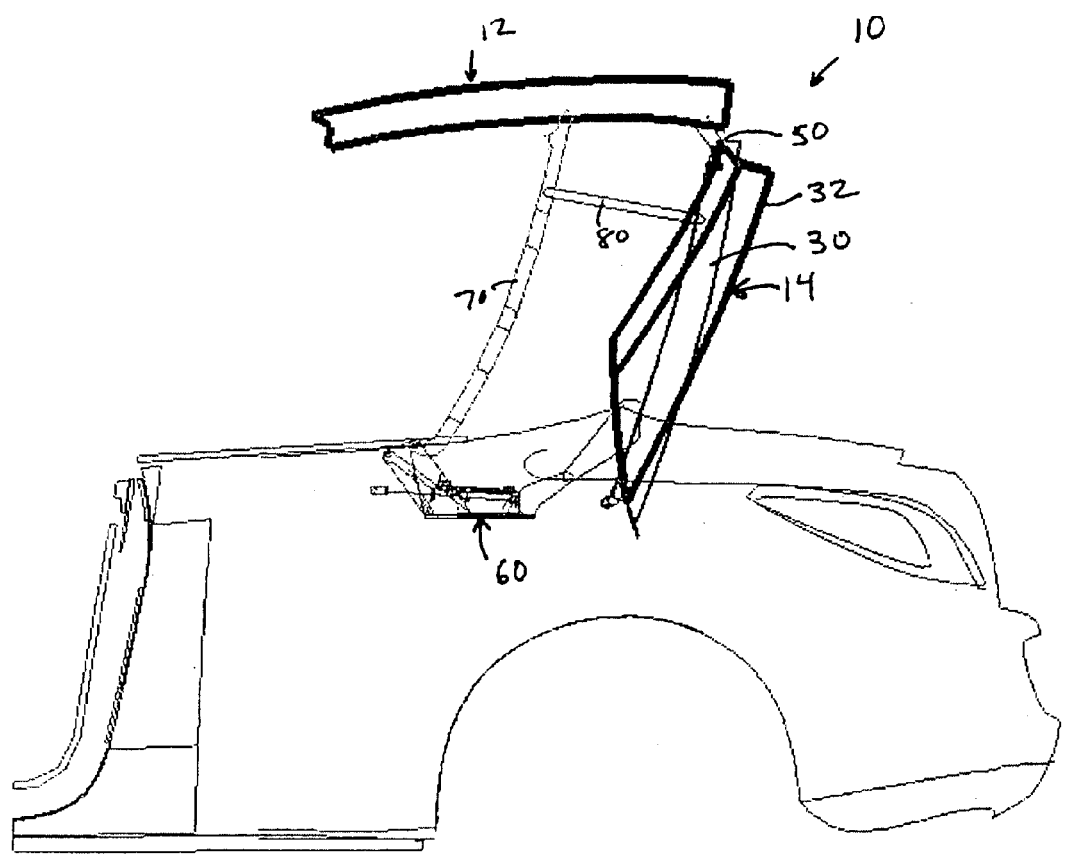
FIG. 3 is a view similar to FIGS. 1 and 2, with the system more fully retracted.
Figure 4:
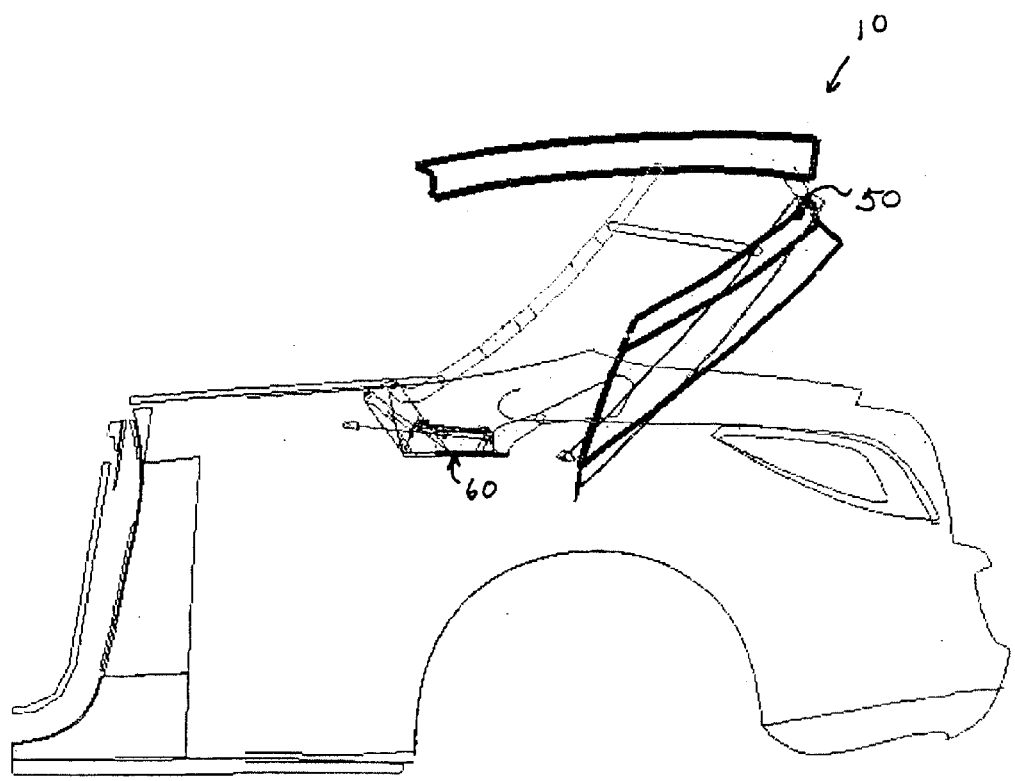
FIG. 4 is a view similar to FIGS. 1–3, with the system yet more fully retracted.
Figure 5:
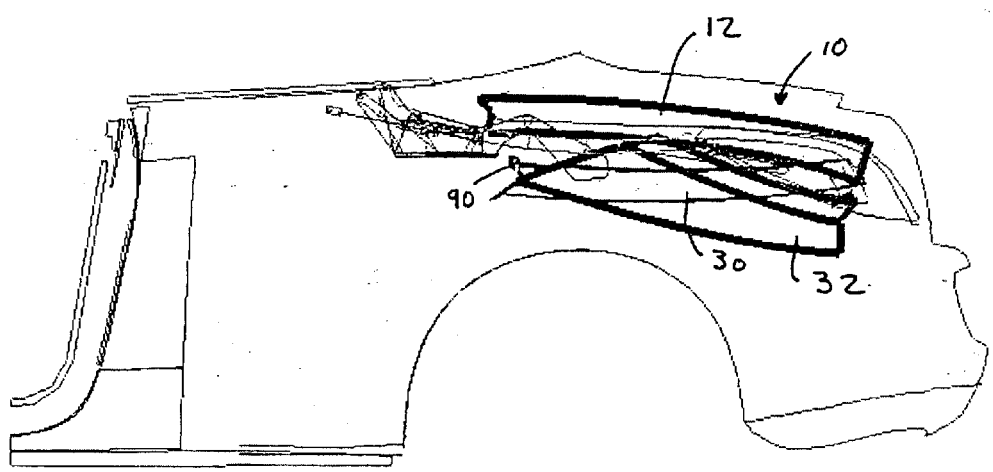
FIG. 5 is a view similar to FIGS. 1–4, with the system fully retracted.
Figure 6:
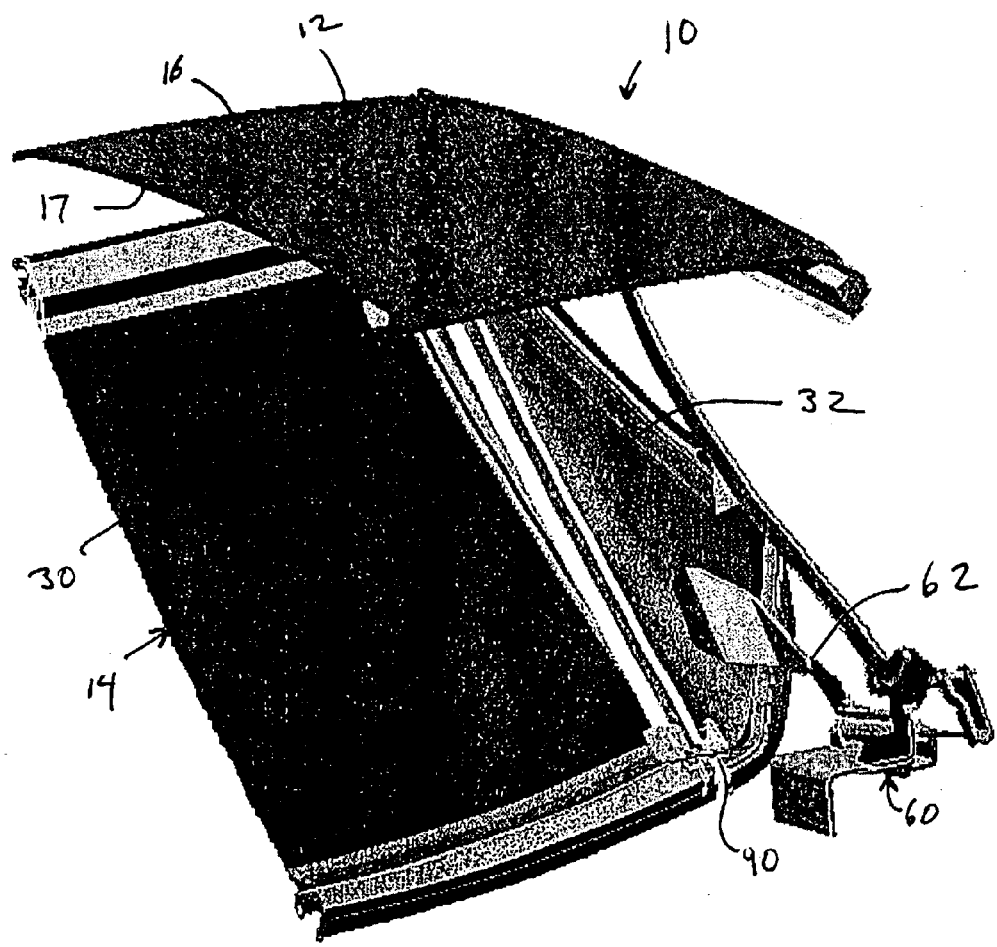
FIG. 6 is a perspective view of the a portion of the hardtop system according to the first preferred embodiment.

FIGS. 1–6 illustrate a first preferred embodiment of the present invention. FIG. 1 illustrates the hardtop system 10 partially retracted from the extended position, wherein it is extended between the vehicle body 1, partially shown, and the header of the windshield, not shown. This figure shows the hardtop system 10 after the front edge has been disconnected from the windshield header, and the system has begun the retraction procedure. FIG. 2 illustrates the system at about a halfway retracted position, and FIGS. 3 and 4 illustrate the system more fully retracted. FIG. 5 illustrates the system in the fully retracted, or stowed, position. FIG. 6 illustrates a portion of the hardtop system, in a partially retracted position, as viewed from the inside so as to better illustrate the linkages used.

The retractable hardtop 10 has a front portion or panel 12 and a rear portion 14. The front panel 12 is preferably a single rigid panel with a convex outer surface 16 and a concave inner surface 17. The outer surface 16 defines a portion of the exterior surface of the roof while the concave inner surface 17 defines a portion of the headliner of the passenger compartment. The front panel 12 has a forward edge 18 that, when extended into position over a passenger compartment, interconnects with the header above the vehicle's windshield. From the forward edge, the front panel 12 extends rearwardly to a rearward edge 20. The front panel 12 extends side-to-side between a pair of side edges.

The rear portion 14 extends from the rear edge 20 of the front panel 12 rearwardly to where the hardtop 10 joins the vehicle body 1. The rear portion 14 has a forward edge 26 adjacent the rearward edge 20 of the front panel 12, and a rearward edge 28 where the rear portion 14 joins the body of the vehicle.

For purposes of the present invention, terms such as forward and rearward refer to the positions of various parts of the hardtop system 10 when it is in the extended position. As will be clear to those of skill in the art, the rear portion 14 flips approximately 180 degrees during retraction, thereby placing the "rearward edge" 28 of the rear portion forward of the "forward edge" 26. However, for consistency, the forward edge 26 of the rear portion 14 will be referred to as the forward edge independent of the position of the vehicle roof. Likewise, terms such as forward or rearward with respect to pivot positions and portions of the various components will also be used with respect to the position of these components when the system 10 is in the extended position, even if being described when in the retracted position.

According to the present invention, the rear portion 14 is divided into three longitudinal portions. The central portion is the rear window or backlight 30. The rear window 30 defines the longitudinally central section of the rear portion 14 and preferably extends from the forward edge 26 to the rearward edge 28. Alternatively, the window could form only a part of the central portion. The side areas of the rear portion 14 are defined by a pair of C pillars, one of which is shown at 32. The C pillar 32 also extends from the forward edge 26 to the rearward edge 28. The C pillars define side edges the rear portion 14. As with the front panel, the rear portion 14 preferably has a convex outer surface and a concave inner surface. The convex outer surface cooperates with the convex outer surface 16 of the front panel to define the roof of the car while the concave inner surfaces cooperate to define the inner surface visible to passengers inside the passenger compartment when the retractable hardtop 10 is in the fully extended position.

In some prior art designs, a two-piece retractable hardtop has a rear portion that is a single piece, similar to the single piece front portion 12 of the present invention. However, in the present invention, the central portion, including the rear window 30, is articulated with respect to the C pillars 32 to achieve improved space utilization.

Each of the C pillars 32 is hingedly interconnected with the front panel 12 at their respective forward 26 edges. The hinge interconnecting the front panel 12 to C pillar 32 is shown at 50 in FIGS. 3 and 4. As will be clear to those of skill in the art, the other C pillar is a mirror image to the C pillar 32, and the hinge for the other C pillar is a mirror image to the hinge 50. Likewise, the remaining components of the system are symmetrical side-to-side. As shown, the hinges 50 for interconnecting the C pillars 32 to the front panel 12 are positioned near the side edges of the front panel 12 and rear portion 14.

Each of the C-pillars is also hingedly interconnected with the vehicle body at their respective rearward edges 28. For purposes of interconnecting the hardtop system 10 with the vehicle body 1, a support assembly 60 is provided. The support assembly 60 provides a plurality of interconnection points for interconnecting various components of the hardtop system. The support assembly 60 preferably is interconnected with the vehicle body, thereby interconnecting the various components of the hardtop system 10 with the vehicle body. While the support assembly is illustrated as a single assembly with multiple attachment points, it may alternatively be a plurality of individual brackets to provide similar attachment points. As shown, the C-pillar 32 is interconnected to the support assembly 60 using a single pivot hinge 62.

A balance link 70 has a first or forward end pivotally interconnected with the front panel 12 at a position forward of the rearward edge 20. The balance link has a second or rearward end that is pivotally interconnected with a support assembly 60. A corresponding balance link is provided on the other side of the vehicle. As will be clear to those of skill in the art, the balance links 70 are preferably provided near the side edges of the roof. The hardtop system 10 forms a pair of four bar linkages. The balance links 70 form one link in each of the linkages, while the C-pillars 32 form the other links in the four bar linkages. Due to the configuration, the front panel 12 remains generally horizontal as it is articulated from the extended position, to the stowed position, shown in FIG. 5. The C-pillars 32, on the other hand, along with the balance links 70, rotate clockwise from a generally horizontal starting position through a generally vertical midposition, shown in FIG. 2, to a generally horizontal retracted position, as shown in FIG. 5.

As best shown in FIGS. 1–3, a window link 80 has a forward end interconnected with the balance link 70, and a rearward end connected with the central window panel 30. A corresponding window link is provided on the other side of the roof system. The rear ends of the window links are preferably interconnected with the window panel 30 near its side edges. These interconnections are preferably simple hinges, and are located a short distance from the forward edge 26 of the central window panel 30.

As best shown in FIG. 6, the central window panel 30 is hingedly interconnected to the C-pillars by simple hinges adjacent its rearward edge 28. One hinge is shown at 90. A corresponding hinge interconnects the other edge of the central window panel 30 to the other C-pillar.

The relative positions of the hinges 90, the balance links 70, and the window links 80, causes the central window panel 30 to articulate with respect to the C-pillars as the roof retracts. In the extended position, the central window panel 30 is held in a position so as to give a smooth outer surface with respect to the C-pillars 32. As retraction begins, as shown in FIG. 1, the relative movement of the balance links and window links causes the forward portion of the central window panel 30 to move inwardly with respect to the C-pillars 32 and 34, by pivoting at the hinges 62 and 64. This process continues as shown in FIGS. 2–4, with the forward portion of the central window panel 30 moving further from the corresponding portions of the C-pillars 32 and 34. FIG. 5 shows the hardtop system 10 in the stowed position, with the forward edge of the central window panel 30 moved closer to the inside surface of the front panel 12, as compared to the C-pillars 32. Stated another way, the forward portion of the central window panel, when the hardtop system 10 in the retracted position, is positioned at a distance from the inner surface from the front panel that is less than the distance between the corresponding portions of the inside edges of the C-pillars 32 and 34 and the inside surface of the front panel 12. This provides substantially increased storage volume in the storage area, where the hardtop system 10 is stowed when retracted.

Referring now to FIGS. 7–11, a second embodiment of the present invention will be described. This embodiment presents an alternative approach to articulating the rear window. Like with the first embodiment, the rear section is divided into three longitudinal portions, including a central window panel and a pair of C pillars. Unlike the first embodiment, the central window panel is hingedly attached at its forward edge to the rearward edge of the front roof panel, and is hingedly attached to the support assembly at its rearward edge.

Figure 7:
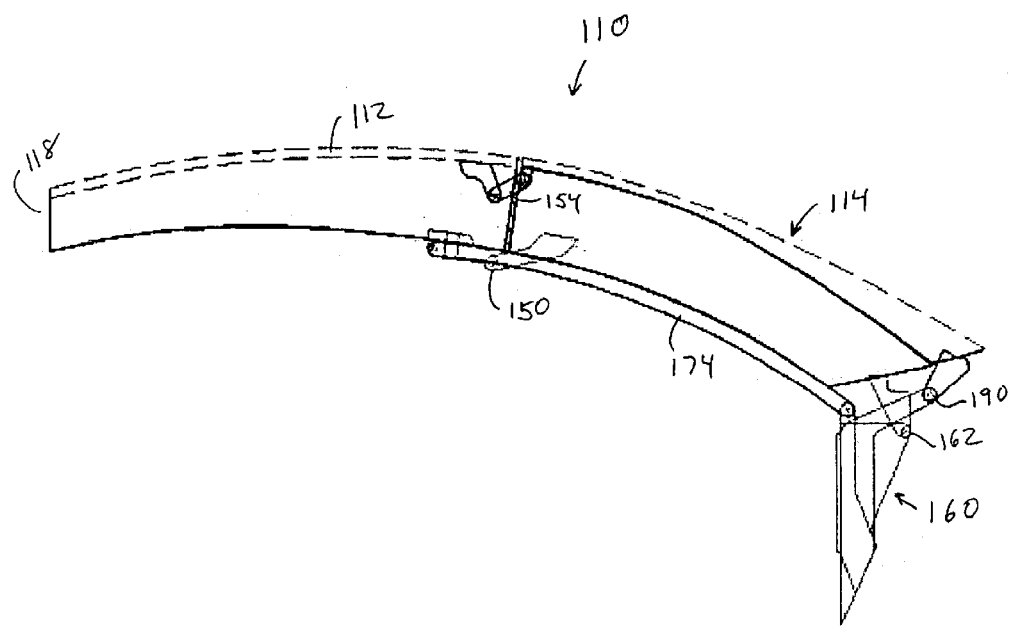
FIG. 7 is a side elevational view of a second embodiment of a retractable hardtop system according to the present invention.
Figure 8:
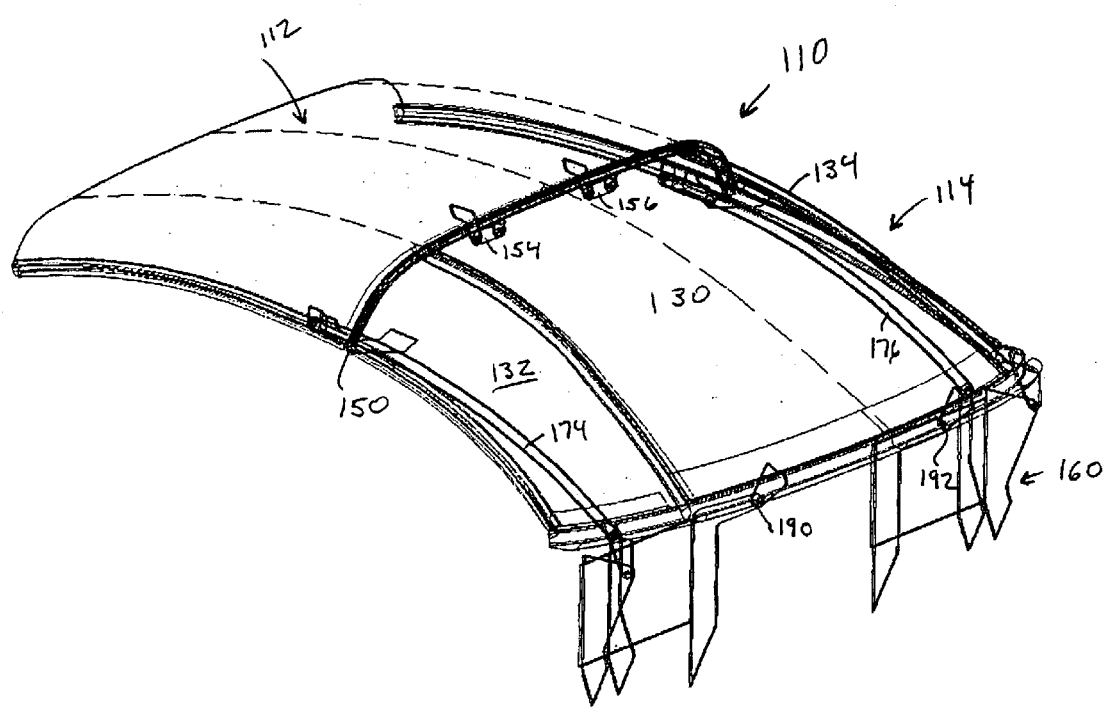
FIG. 8 is a perspective view of the hardtop system of FIG. 7.
Figure 9:
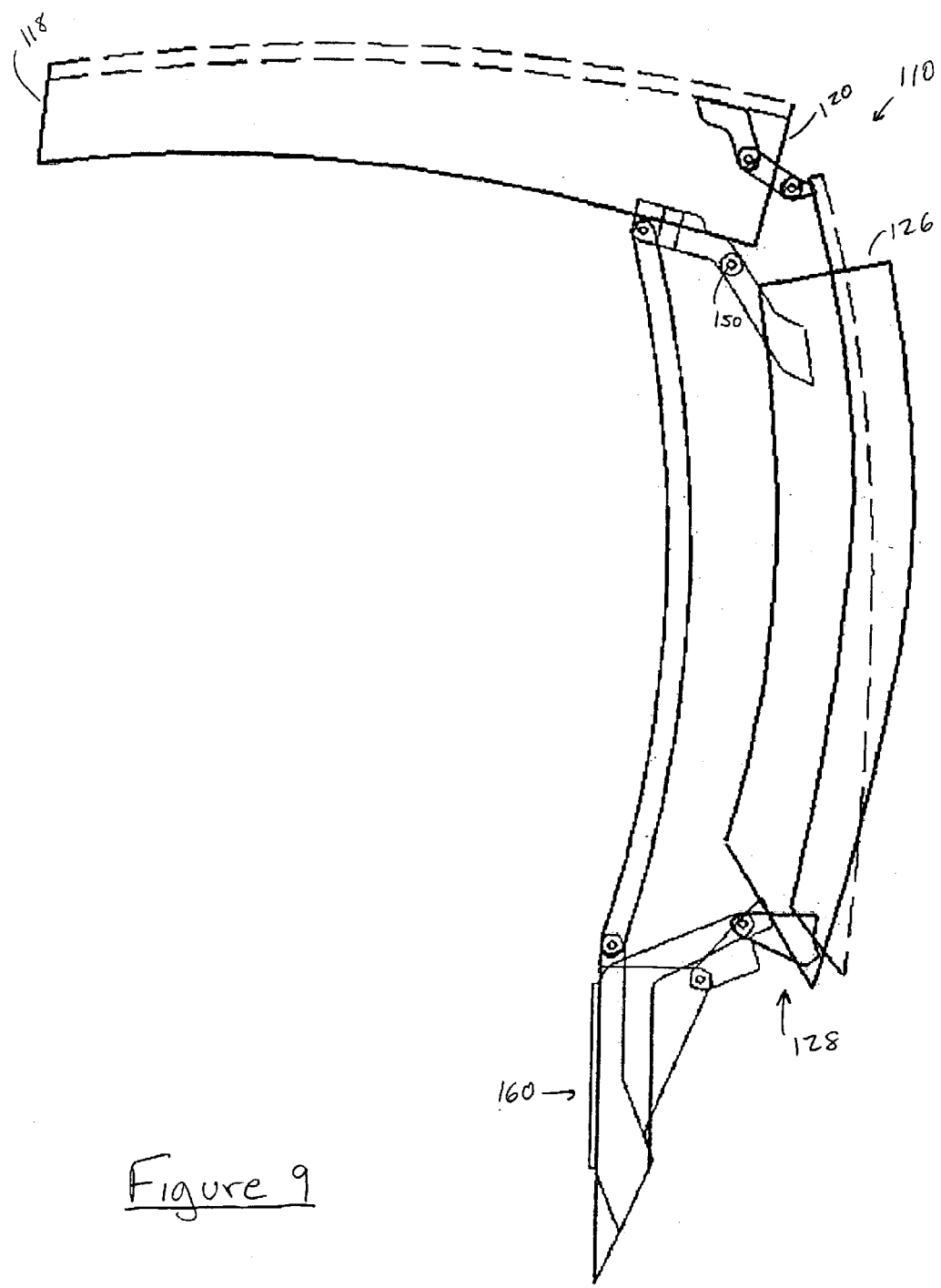
FIG. 9 is a view similar to FIG. 7, with the system approximately half way retracted.
Figure 10:
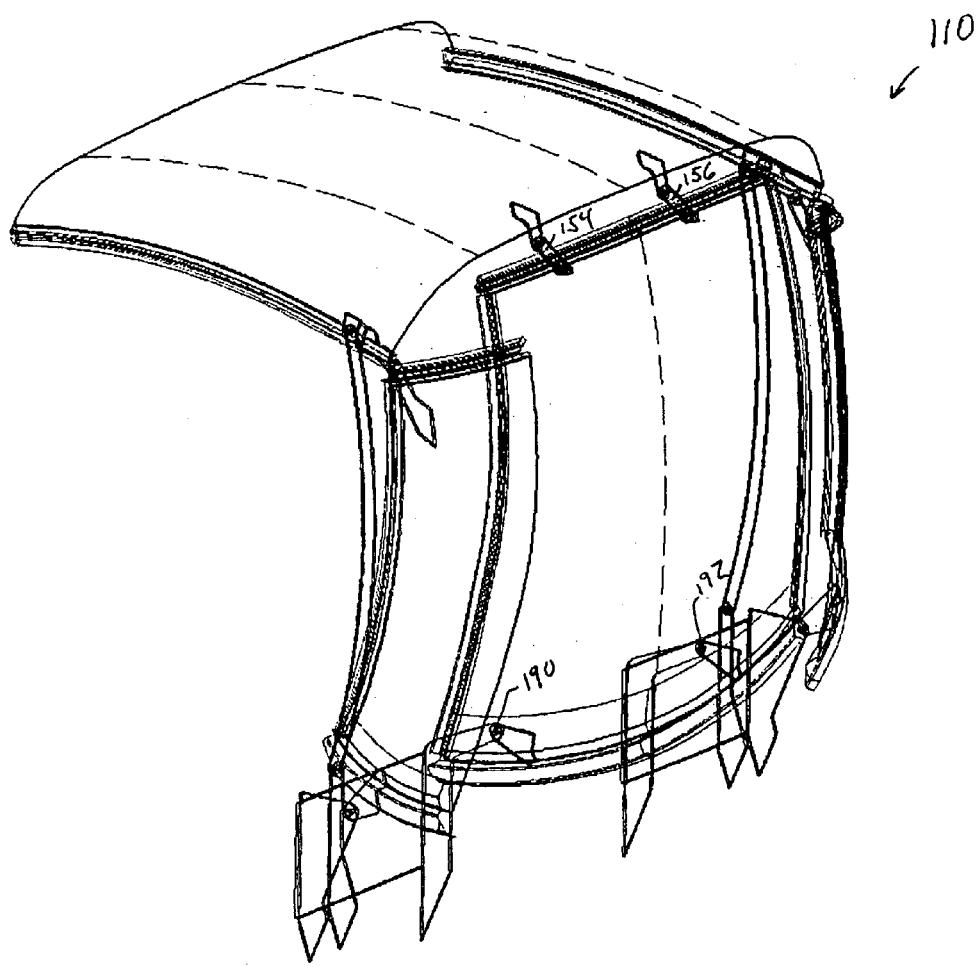
FIG. 10 is a view similar to FIG. 8, with the system approximately half way retracted.
Figure 11:
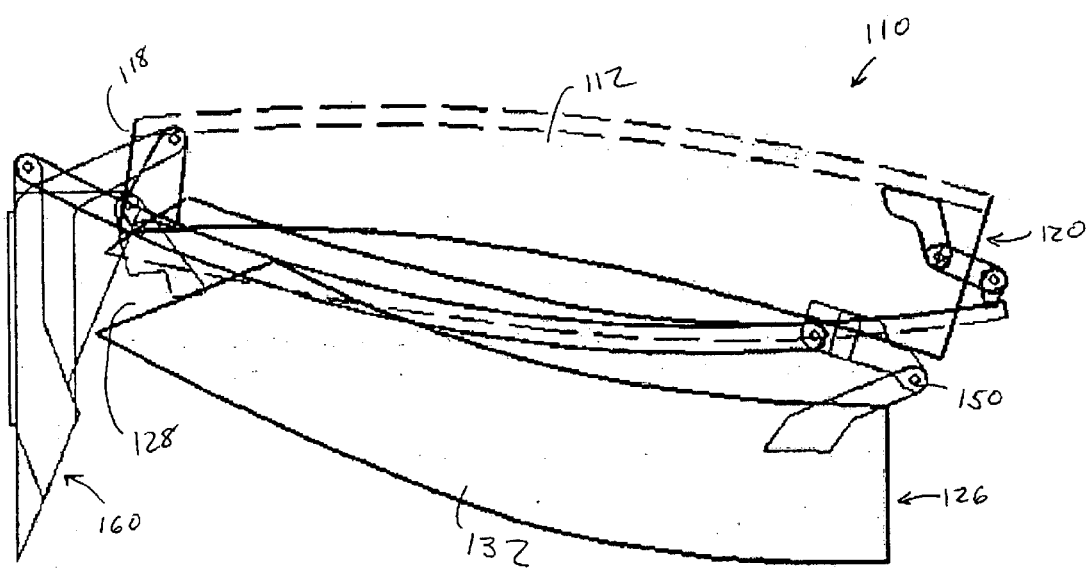
FIG. 11 is a view similar to FIGS. 7 and 9, with the system fully retracted.

FIGS. 7 and 8 illustrate the hardtop system 110 in the fully extended position, with FIG. 7 showing a side view and FIG. 8 showing a rear perspective view. FIGS. 9 and 10 show the hardtop system 110 at about a half way retracted position, and FIG. 11 shows the hardtop system 110 in the stowed position.

The hardtop system 110 has a front portion or panel 112 and a rear portion 114. The front panel 112 is preferably a single rigid panel with a convex outer surface and a concave inner surface. The front panel 112 has a forward edge 118 that, when extended in the position shown in FIGS. 7 and 8, interconnects with the header above the vehicle's windshield. From the forward edge 118, the front panel 112 extends rearwardly to a rearward edge 120. The rear portion 114 extends from the rear edge 120 of the front panel 112 rearwardly to where the hardtop 110 joins the vehicle body, not shown. The rear portion 114 has a forward edge 126 adjacent the rearward edge 120 of the front panel, and a rearward edge 128 where the rear portion 114 joins the body of the vehicle.

As with the previous embodiment, the rear portion 114 is divided into three longitudinal portions. The central portion 130 includes a rear window or backlight. The central window panel 130 defines the longitudinally central section of the rear portion 114, and preferably extends from the forward edge 126 to the rearward edge 128. Alternatively, the window or window panel may form only a part of the central portion. The side areas of the rear portion 114 are defined by a pair of C pillars, 132 and 134. The C pillars 132 and 134 also extend from the forward edge 126 to the rearward edge 128. The C pillars define side edges of the rear portion 114. As with the front panel, the rear portion 114 preferably has a convex outer surface and a concave inner surface. The convex outer surface cooperates with the convex outer surface of the front panel to define the roof of the car, while the concave inner surfaces cooperate to define the inner surface visible to passengers inside the passenger compartment when the retractable hardtop 110 is in the fully extended position.

Each of the C pillars 132 and 134 is hingedly interconnected with the front panel 112 at their respective front edges 126. The hinge interconnecting the front panel 112 to C pillar 132 is shown at 150. A corresponding hinge between C pillar 134 and front panel 112 is provided on the other side of the hardtop 110. As shown, the hinges for interconnecting the C pillars to the front panel are positioned near the side edges of the front panel and rear portion.

Each of the C pillars 132 and 134 is also hingedly interconnected with the vehicle body at their respective rearward edges 128. Again, a support assembly 160 is used for interconnecting the hardtop 110 with the vehicle body. While the support assembly 160 is illustrated as several bracket assemblies, it may alternatively be provided by other brackets, or as a single assembly. As shown, the C pillar 132 is interconnected with the support assembly 160 using a single pivot hinge 162. A corresponding hinge interconnection is provided at the other side of the hardtop 110 for interconnecting the C pillar 134 with the support assembly 160.

The central window panel 130 is independently interconnected with the front panel 112 using links 154 and 156. In each case, a pivot bracket is connected to the central window panel 130 adjacent the forward edge 126. Additional pivot brackets are connected to the front panel 112 adjacent the rearward edge 120, and in longitudinal alignment with the pivot brackets on the panel 130. Alternatively, any brackets described herein could be formed integrally with a panel, or other component. The links 154 and 156 extend between the front and rear pivot brackets. As shown, the front end of the links 154 and 156 are pivotally interconnected with the brackets at a position that is somewhat vertically lower than the pivotal interconnection between the rearward ends of the links 154 and 156 and the pivot brackets.

A pair of balance links 174 and 176 have rearward ends that are pivotally interconnected with the support assembly 160 and forward ends that are pivotally interconnected with the front panel 112. Specifically, the front panel 112 has a pair of pivot brackets adjacent the sides of the front panel 112, as best shown in FIGS. 8 and 10. As best shown in FIG. 7, the pivotable interconnection point between the balance links and bracket is positioned significantly lower than the link 154 and somewhat forward of the rearward edge 120 of the front panel 112. From this point, the balance link 174 preferably extends arcuately rearwardly (for clearance purposes) to a pivotal interconnection to the support assembly 160. The balance links serve to articulate the front panel with respect to the rear panel, as will be clear by reviewing the remaining figures.

The backlight 130 is pivotally interconnected with the support assembly 160 at pivot points 190 and 192. Compared to the pivot point between the balance link 174 and the assembly 160, the pivot points 190 and 192 are closer to the center line of the car, are slightly vertically higher, and are positioned substantially more rearwardly. The C pillars 132 and 134 are separately pivotally interconnected with the support bracket assemblies at 162. These pivot points are somewhat lower than the other pivot points, and outboard of the remaining pivots such that these pivots are nearer to the side edges. It should be noted that a mechanism for actually moving the hardtop 110 is not illustrated. However, the hardtop 110 may be either manually or automatically actuated by connecting an actuator to one or more parts of the top 110.

Referring now to FIGS. 9 and 10, the retractable hardtop 110 is shown in a partially retracted position. As shown, the C pillars 132 and 134 have pivoted clockwise in the side view, as has the window panel 130. The front panel 112 remains horizontal so as to partially fold its concave inner surface towards the concave inner surface of the rear portion.

FIG. 11 shows the retractable hardtop 110 in a fully retracted or storage position. In this position, the front panel 112 has folded against the C pillars 132 and 134 and the window panel 130 has articulated to a position very close to the concave inner surface of the front panel 112. As will be clear to those of the skill in the art, the more upward positioning of the window panel 130 gives a significant increase in storage space. That is, if the window panel were connected to the C pillars 132 and 134, it would extended downwardly into the storage area. However, because it has been separately hinged and thereby moves upwardly adjacently the front panel 112, much of the space that would have been occupied by the window panel 30 is freed for storage.

Figure 12:
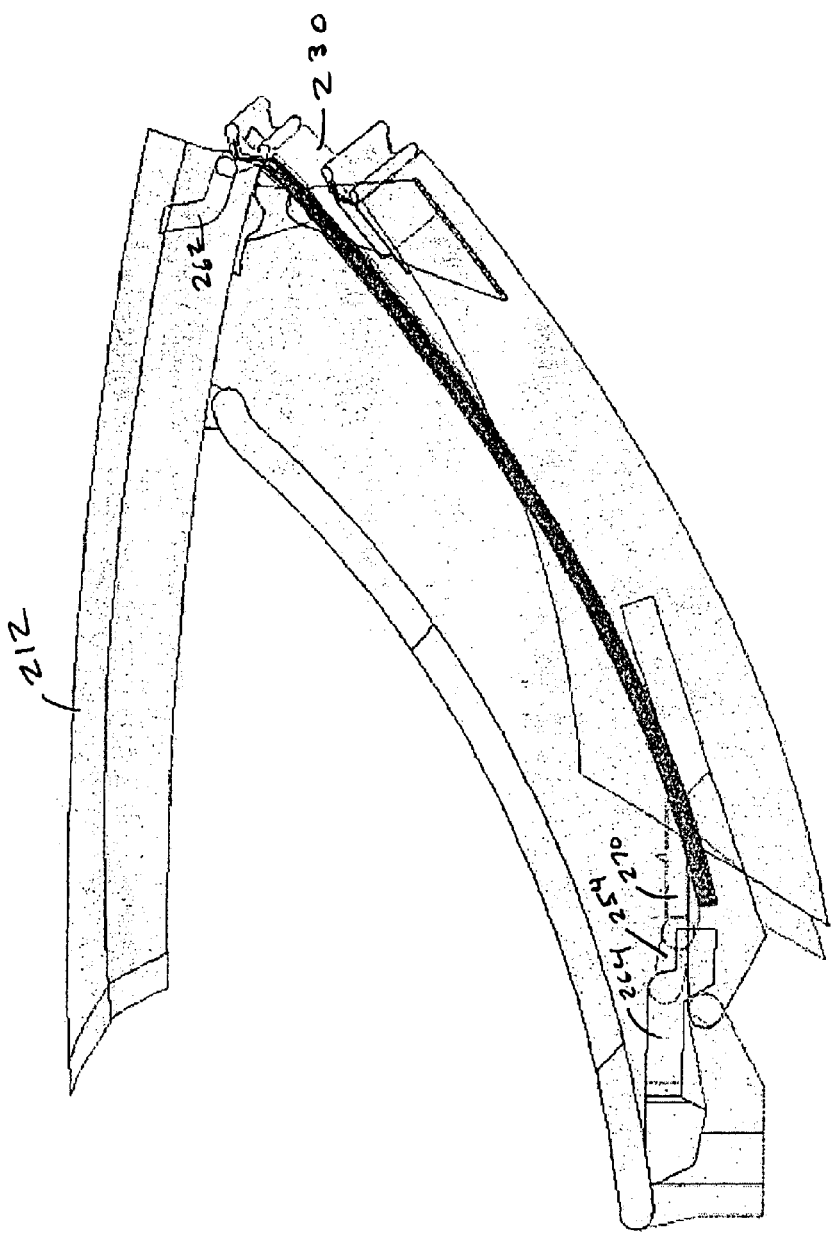
FIG. 12 is a side elevational view of an alternative version of the second embodiment of a hardtop system according to the present invention.
Figure 2:
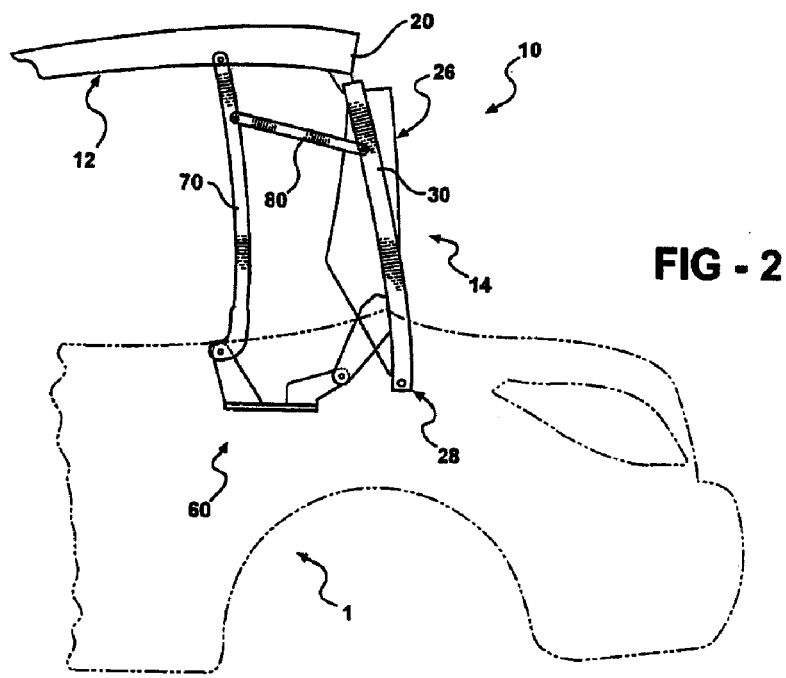
Figure 5:
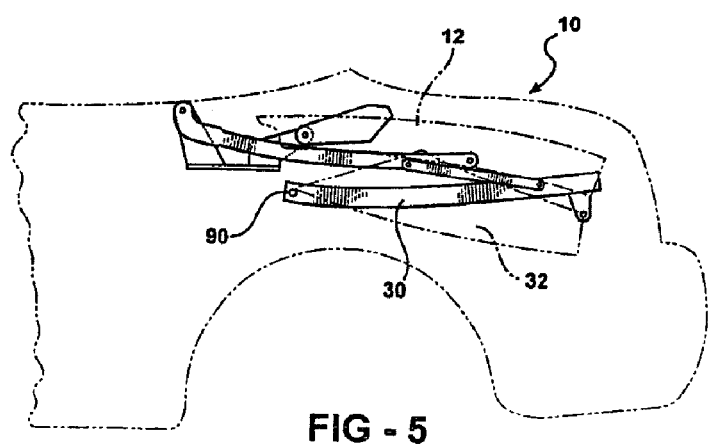
Figure 3:
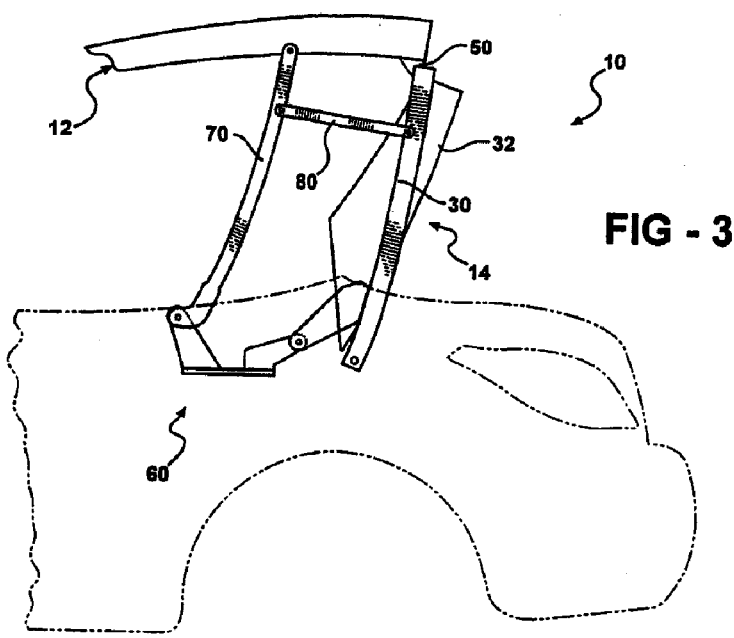
Figure 4:
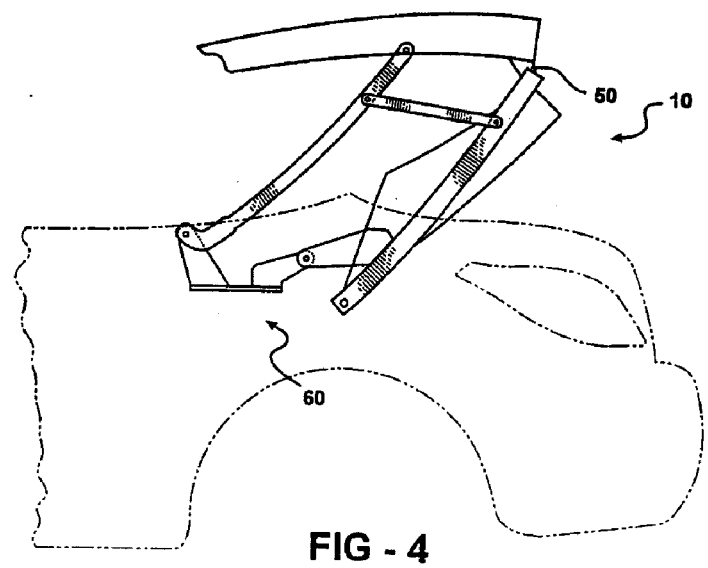
Figure 6:
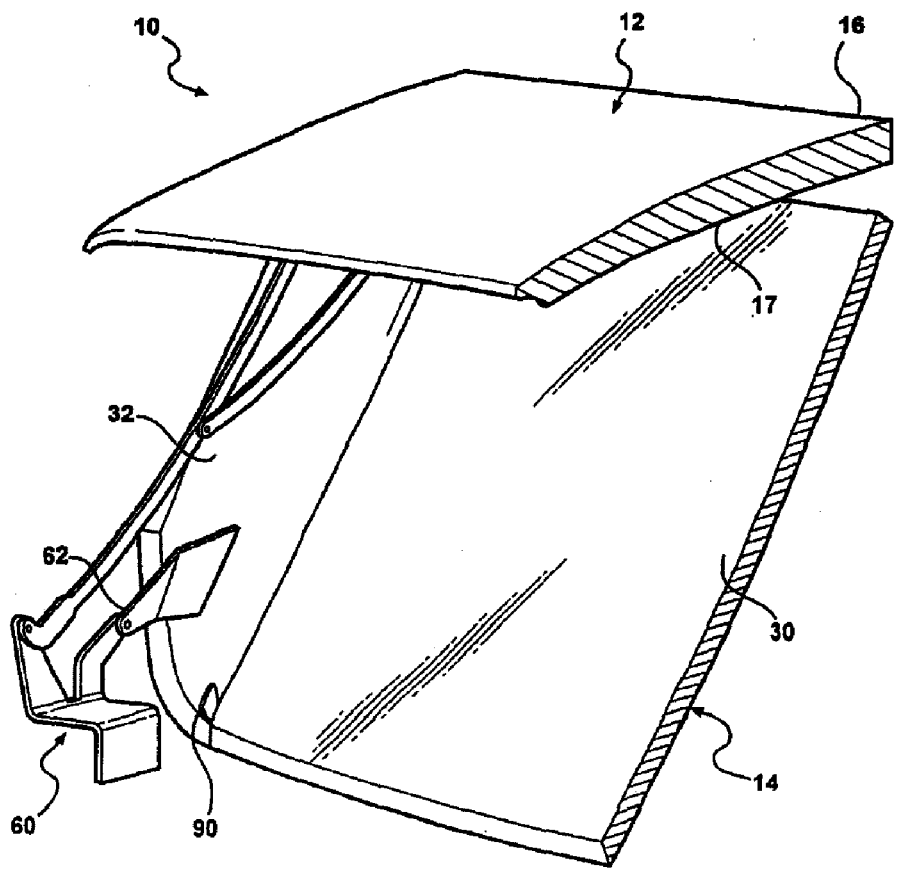
Figure 9:
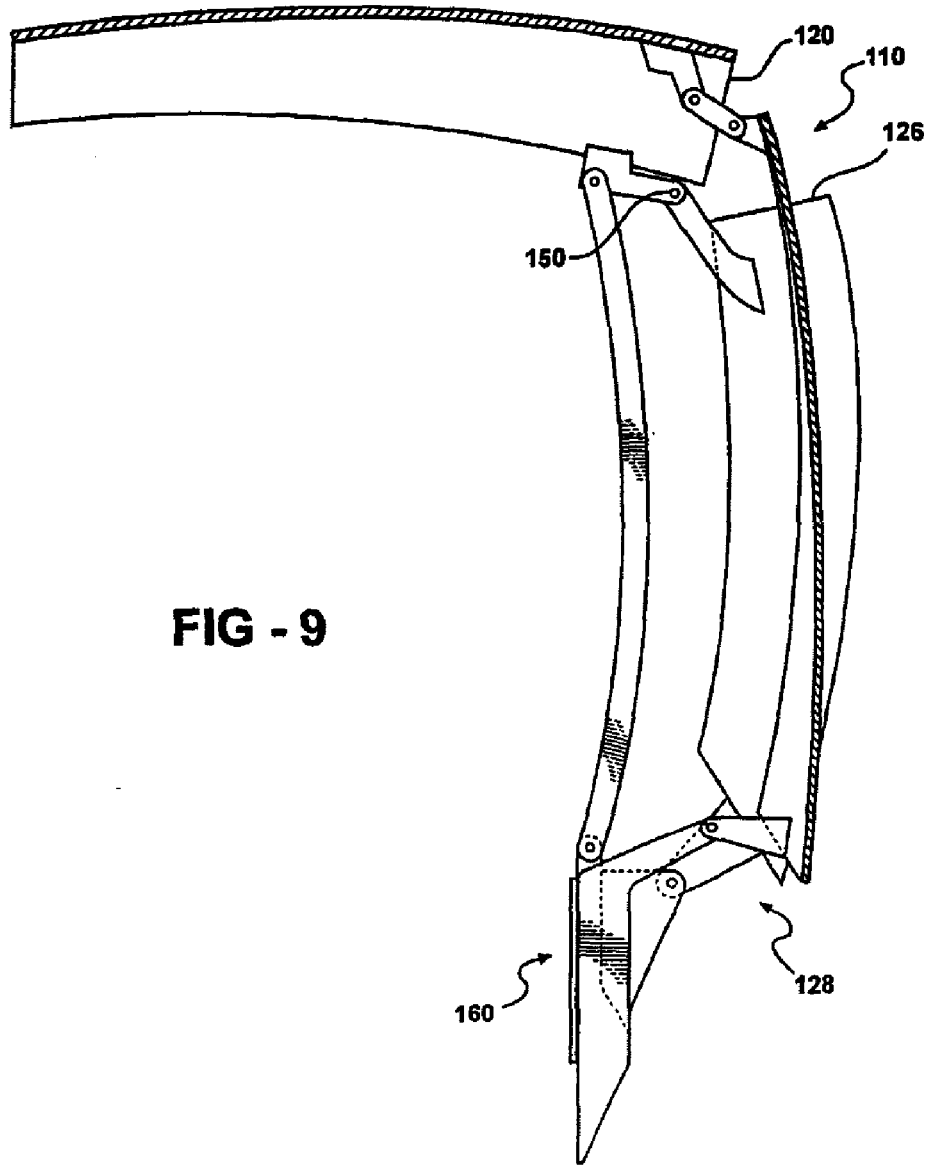
Figure 10:
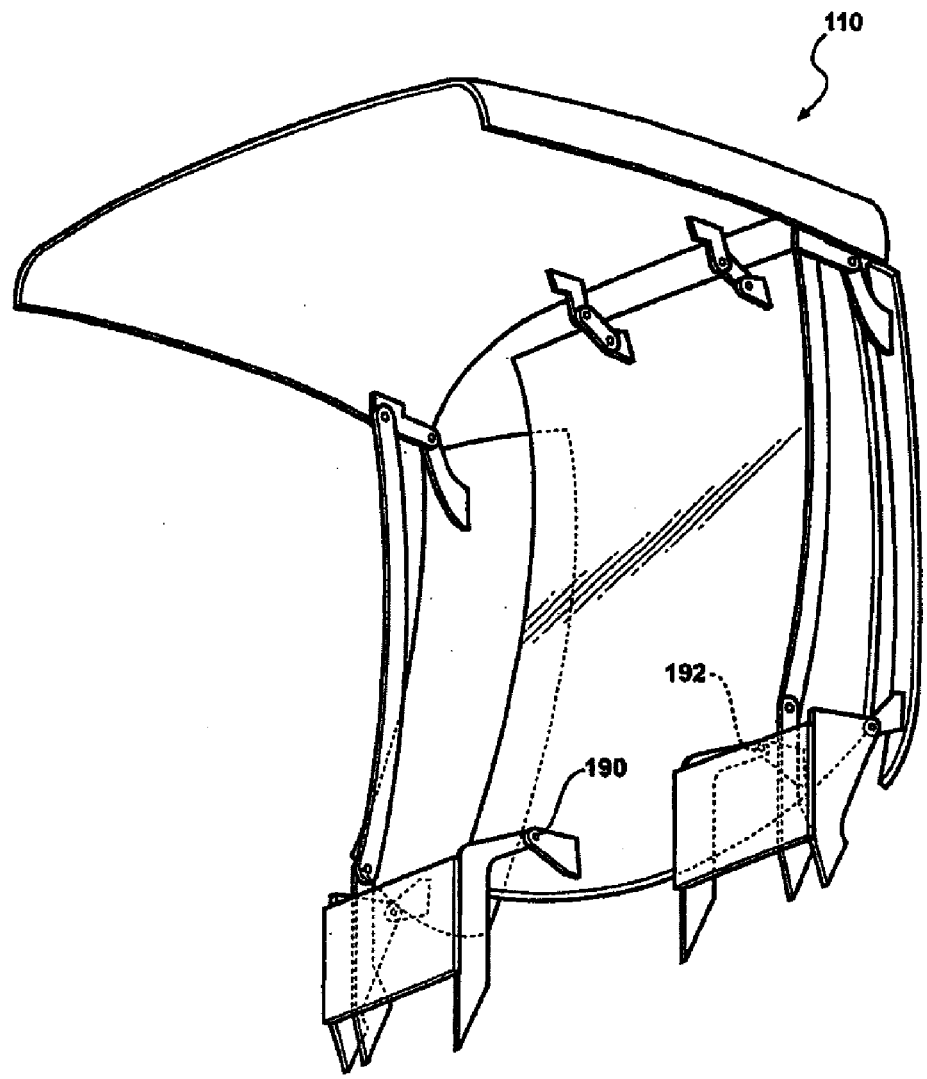
Figure 11:
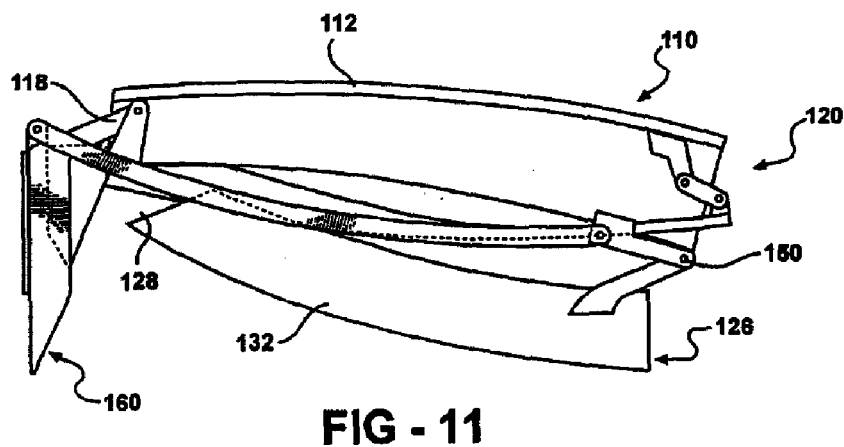
Figure 12:
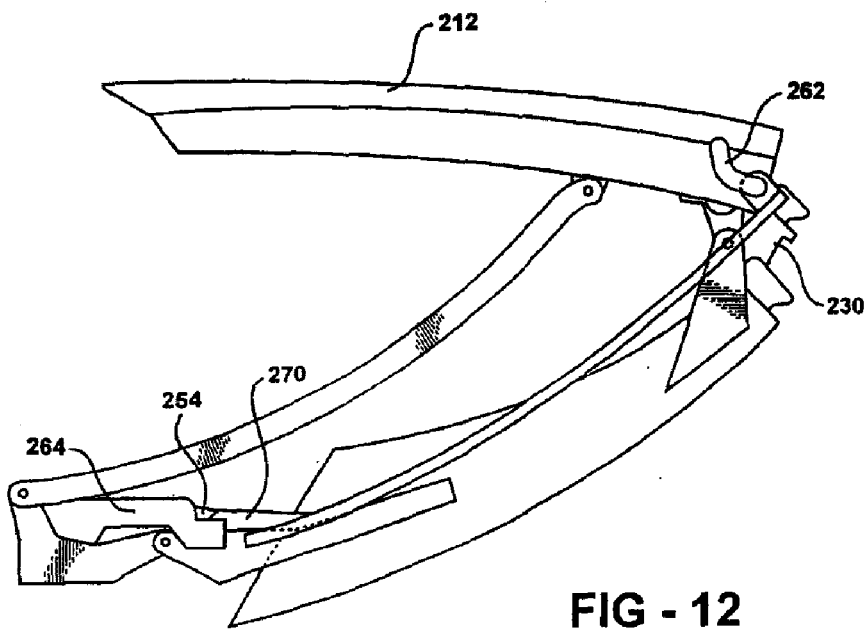

Referring now to FIG. 12, an alternative version of this embodiment will be described. In the previous version, the window panel 130 was interconnected with the front panel 112 using links 154 and 156, and was pivotally interconnected with the body structure by support brackets at pivot points 190 and 192. Therefore, the interconnection between the window panel 130 and the vehicle structure at the rear of the window panel was a simple pivot, while at the front end, intermiediate links 154 and 156 were used to interconnect the window panel with the front panel 112. In the alternative version of FIG. 12, the pivot and intermediate links are traded front to rear. That is, the window panel is interconnected with the front panel via a simple pivot and interconnected with the body structure at the rear using an intermediate link. Referring to FIG. 12, the window panel is indicated at 230 and the front panel is indicated at 212. A bracket 262 is interconnected with the front panel 212 near the trailing edge. Because FIG. 11 is a side view, only a single pivot bracket is visible. However, symmetrical paired brackets and pivots are preferably used. At the rear end of the system, a support bracket 264 is interconnected with the body structure. A corresponding attachment bracket 270 is provided at the trailing edge of the window panel 230, and an intermediate link 254 interconnects the brackets 270 and 264. The variation of FIG. 12 provides an alternative to the earlier embodiment, and provides somewhat different articulation.

As will be clear to those of skill in the art, the embodiments of the present invention may be altered in various ways without departing from the scope or teaching of the present invention. It is the following claims, including all equivalents, which define the scope of the invention.

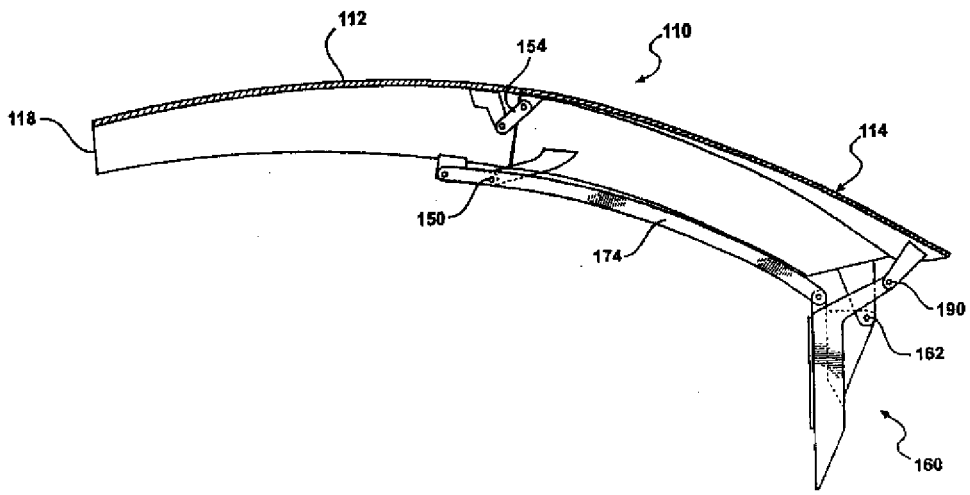

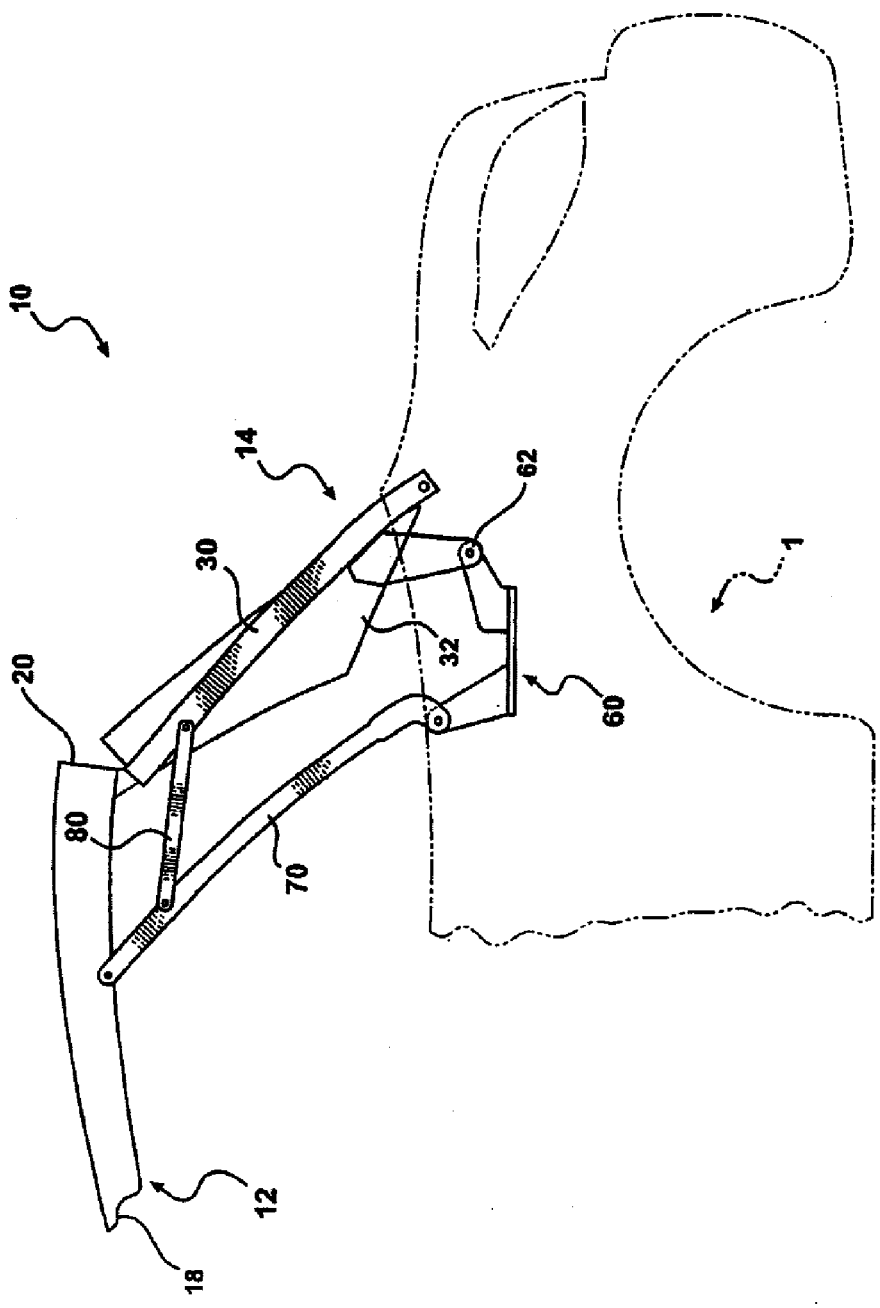

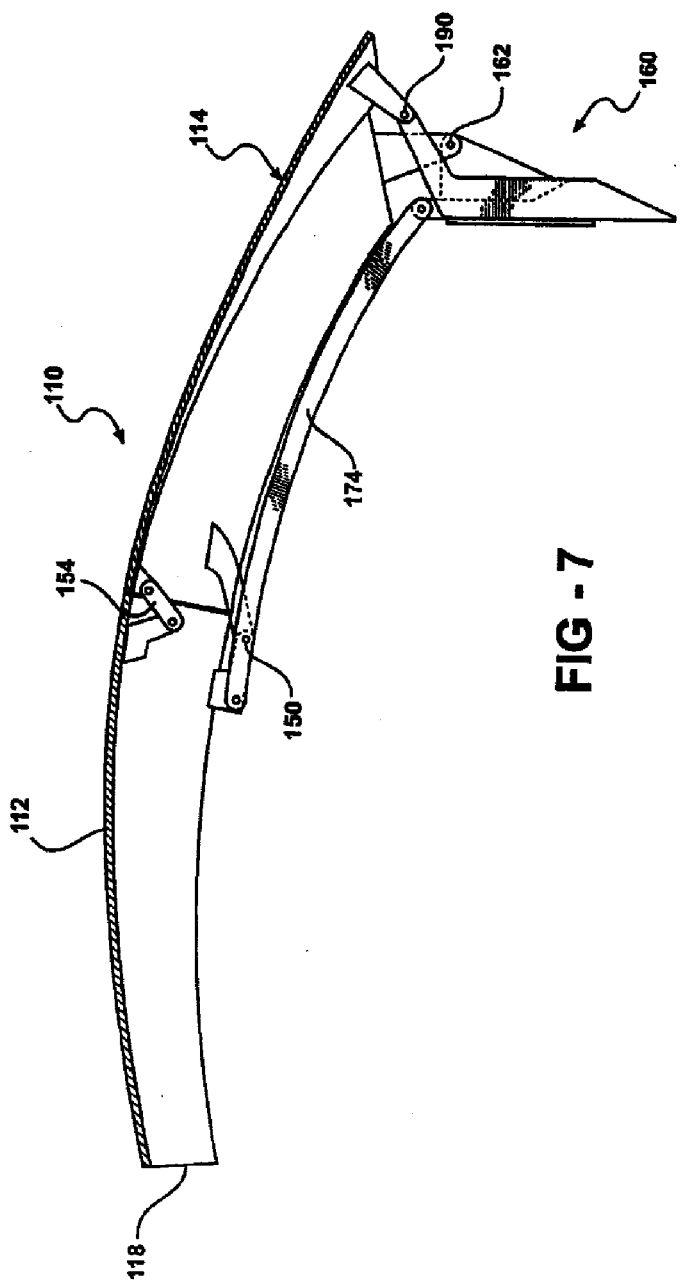

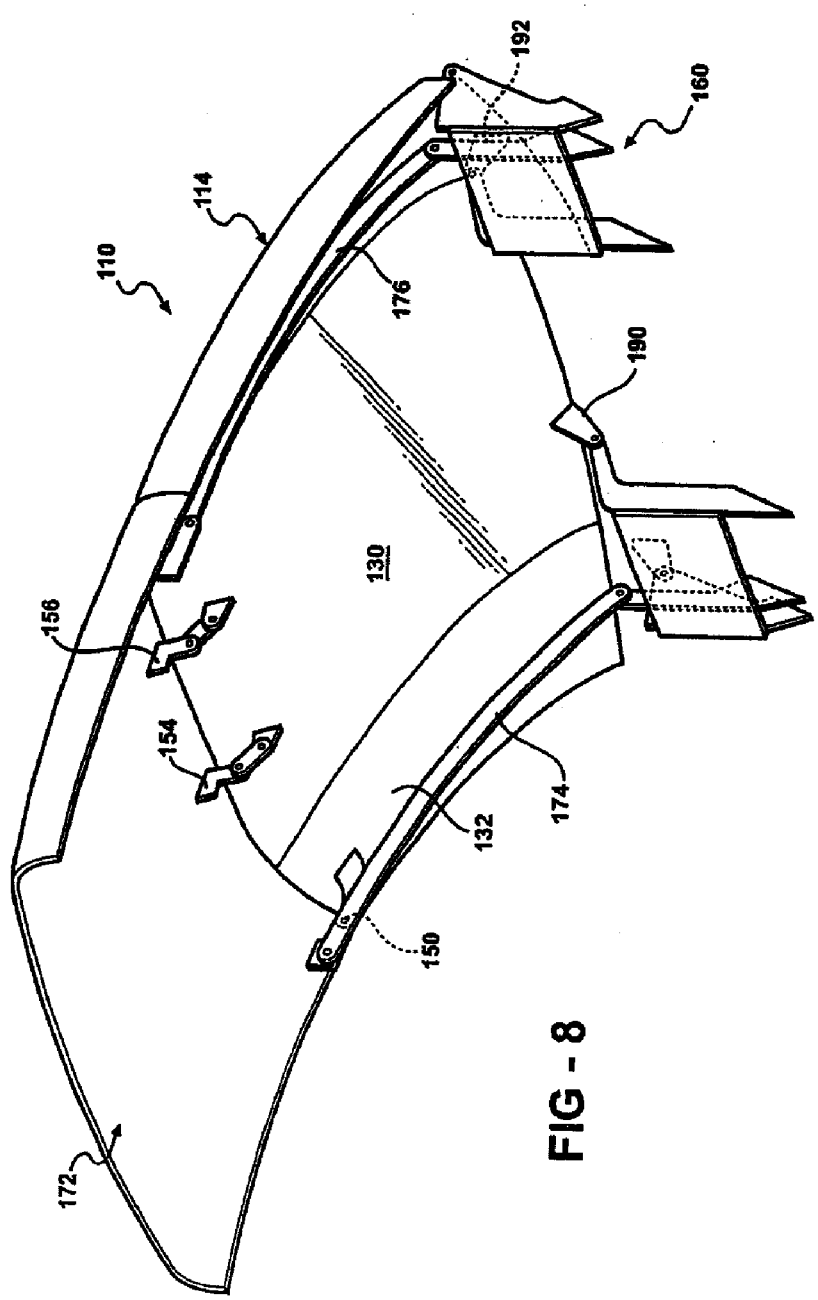

What is claimed is:

1. A retractable hardtop system for a vehicle having a passenger compartment and a storage area behind the passenger compartment, the hardtop system having an extended position wherein the hardtop system defines a roof over the passenger compartment and a retracted position wherein the hardtop system does not cover the passenger compartment and at least a portion of the hardtop system is disposed in the storage area, the vehicle having a body, and a windshield defining the forward end of the passenger compartment, the windshield having a header, the hardtop system comprising:
   a support assembly for supporting the remainder of the hardtop system and interconnecting with the vehicle body; and
   a rear portion being disposed rearwardly of the front panel and defining the remainder of the roof over the passenger compartment when the system is in the extended position, the rear portion comprising:
      a central window panel having a forward edge, a rearward edge, and a pair of sides, the central window panel being hingedly linked with the support assembly at its rearward edge and hingedly linked to the front panel at their forward edge; and
      a pair of C-pillars each having a forward edge, a rearward edge, an inside edge and an outside edge, the inside edges of the C-pillars being disposed adjacent the sides of the central window panel when the system is in the extended position, the C-pillars each being hingely linked to the support assembly at their rearward edges and hingedly linked to the front panel at their forward edges; and
   the system configured such that when the system is in the retracted position, at least a portion of the central window panel is articulated to a position wherein a distance between the portion of the central window and the inner surface of the front panel is less than a distance between the inside edges of the C-pillars and the inner surface of the front panel.

2. The system according to claim 1, wherein the central window panel is a transparent panel, the forward edge of the central panel being disposed adjacent the rearward edge of the front panel and the rearward edge of the central panel being disposed adjacent the rearward edges of the C-pillars when the system is in the extended position.

3. The system according to claim 1, wherein each link between the C-pillars and the front panel is a single pivot.

4. The system according to claim 1, wherein each link between the C-pillars and the support assembly is a single pivot.

5. The system according to claim 1, wherein each link between the central window panel and the front panel is a single pivot.

6. The system according to claim 1, wherein two pivots interconnect the central window panel with the front panel.

7. The system according to claim 1, wherein each link between the central window and the front panel is a connection link having a first end pivotally interconnected with the central window panel and a second end pivotally interconnected with the front panel.

8. The system according to claim 1, wherein each link between the central window panel and the support assembly is a single pivot.

9. The system according to claim 1, wherein each link between the central window and the support assembly is a connection link having a first end pivotally interconnected with the central window panel and a second end pivotally interconnected with the support assembly.

10. The system according to claim 1, wherein two pivots interconnect the central window panel with the front panel, the pivots being adjacent the sides of the central window panel.

11. The system according to claim 10, wherein the support assembly comprises a plurality of brackets.

* * * * *

UNITED STATES PATENT AND TRADEMARK OFFICE
CERTIFICATE OF CORRECTION

PATENT NO. : 6,866,324 B2
DATED : March 15, 2005
INVENTOR(S) : Frank Neubrand et al.

It is certified that error appears in the above-identified patent and that said Letters Patent is hereby corrected as shown below:

Drawing sheets, consisting of Fig. 1 thru Fig. 12, should be deleted and replaced with the drawing sheets, consisting of Fig. 1 thru Fig. 12, as shown on the attached pages.

Column 3,
Line 35, delete "intermiediate", insert -- intermediate --.

Column 10,
Line 15, delete "their", insert -- its --.
Line 64, delete "claim 10", insert -- claim 1 --.

Signed and Sealed this

Twenty-sixth Day of July, 2005

JON W. DUDAS
*Director of the United States Patent and Trademark Office*

(12) United States Patent
Neubrand et al.

(10) Patent No.: US 6,866,324 B2
(45) Date of Patent: Mar. 15, 2005

(54) FOLDING HARDTOP WITH REAR WINDOW ARTICULATION

(75) Inventors: Frank Neubrand, West Bloomfield, MI (US); Wolfgang Ulrich Richter, Commerce Township, MI (US)

(73) Assignee: SSR Roofing Systems, L.L.C., Plymouth, MI (US)

(*) Notice: Subject to any disclaimer, the term of this patent is extended or adjusted under 35 U.S.C. 154(b) by 86 days.

(21) Appl. No.: 10/359,950

(22) Filed: Feb. 6, 2003

(65) Prior Publication Data

US 2004/0004369 A1 Jan. 8, 2004

Related U.S. Application Data

(60) Provisional application No. 60/359,522, filed on Feb. 25, 2002, and provisional application No. 60/393,825, filed on Jul. 3, 2002.

(51) Int. Cl.$^7$ .................................................. B60J 7/14
(52) U.S. Cl. ........................................ 296/108; 296/107.07
(58) Field of Search ........................ 296/107.07, 107.08, 296/107.17, 108

(56) References Cited

U.S. PATENT DOCUMENTS

| | | | |
|---|---|---|---|
| 2,234,040 A | 3/1941 | Carr | 296/107.2 |
| 2,303,789 A | 12/1942 | Carr | 296/107.2 |
| 2,957,725 A | 10/1960 | Ford | 296/107.2 |
| 3,536,354 A | 10/1970 | Ingram | 296/147 |
| 4,543,747 A | 10/1985 | Kaltz et al. | 296/49 |
| 4,784,428 A | 11/1988 | Moy et al. | 296/107.07 |
| 5,195,798 A * | 3/1993 | Klein et al. | 296/146.14 |
| 6,019,416 A | 2/2000 | Beierl | 296/107.17 |
| 6,039,383 A * | 3/2000 | Jambor et al. | 296/108 |
| 6,073,988 A | 6/2000 | Huber | 296/116 |
| 6,086,136 A * | 7/2000 | Jambor et al. | 296/107.17 |
| 6,123,381 A | 9/2000 | Schenk | 296/107.07 |
| 6,131,988 A | 10/2000 | Queveau | 296/107.17 |
| 6,142,555 A | 11/2000 | Huber | 296/107.17 |
| 6,257,648 B1 | 7/2001 | Schenk | 296/107.07 |
| 6,283,532 B1 | 9/2001 | Neubrand | 296/107.07 |
| 6,302,470 B1 | 10/2001 | Maass | 296/107.07 |
| 6,382,703 B1 * | 5/2002 | Queveau et al. | 296/107.17 |
| 6,390,532 B1 | 5/2002 | Mac Farland | 296/107.17 |
| 6,425,620 B1 * | 7/2002 | Schutt et al. | 296/107.07 |
| 6,485,085 B1 | 11/2002 | Pecho | 296/107.07 |
| 6,497,446 B2 | 12/2002 | Obendiek | 296/107.17 |
| 6,513,857 B2 | 2/2003 | Pfertner | 296/107.07 |
| 6,582,009 B2 | 6/2003 | Wezyk | 296/180.1 |
| 6,592,169 B2 | 7/2003 | Obendiek | 296/107.07 |
| 6,629,718 B2 | 10/2003 | Bauer et al. | 296/108 |
| 2001/0033089 A1 | 10/2001 | Maass | 296/107.17 |
| 2002/0050727 A1 | 5/2002 | Hasselgruber | 296/107.17 |
| 2002/0185886 A1 | 12/2002 | Obendiek | 296/108 |
| 2003/0047962 A1 | 3/2003 | Guillez | 296/107.18 |
| 2003/0160475 A1 | 8/2003 | Tohda et al. | 296/124 |

* cited by examiner

*Primary Examiner*—Dennis H. Pedder
(74) *Attorney, Agent, or Firm*—Gifford, Krass, Groh, Sprinkle, Anderson & Citkowski, PC

(57) ABSTRACT

A retractable hardtop system with a rigid front panel and a rear portion including a pair of C-pillars and a central window panel therebetween has the window panel hingedly linked to the C-pillars and the C-pillars hingedly linked to both the vehicle body and the front panel. In a retracted position, a portion of the central window panel is articulated to an elevated position with respect to the C-pillars in order to increase usable space below the retracted system.

11 Claims, 12 Drawing Sheets